Dec. 10, 1935.   J. G. JACKSON   2,023,812

BAKING PAN SET

Filed July 11, 1934

INVENTOR
JOSEPH G. JACKSON
BY Charles J. Wilson
ATTORNEY

Patented Dec. 10, 1935

2,023,812

UNITED STATES PATENT OFFICE 2,023,812

BAKING PAN SET

Joseph G. Jackson, Oak Park, Ill., assignor to Edward Katzinger Company, Chicago, Ill., a corporation of Illinois Application July 11, 1934, Serial No. 734,587

11 Claims. (Cl. 53—6)

This invention relates to baking pan sets generally and to the straps by which the individual pans of the set are joined together to create a multiple unit pan set. Among its other objects, the present invention contemplates a strap which incorporates elements to guide or center the pan sets, thereby regulating and determining their respective positions when two or more are nested or stacked for storage purposes. It furthermore has in view the maintenance of the nested or stacked pan sets in such spaced relationship as to prevent the marking or marring of the interior surfaces of pan walls and to provide an increased air circulation between the nested or stacked sets.

With the above and other objects in view, as will be apparent, this invention consists in the construction, combination and arrangement of parts, all as hereinafter more fully described, claimed and illustrated in the accompanying drawing, wherein:—

Figure 1:
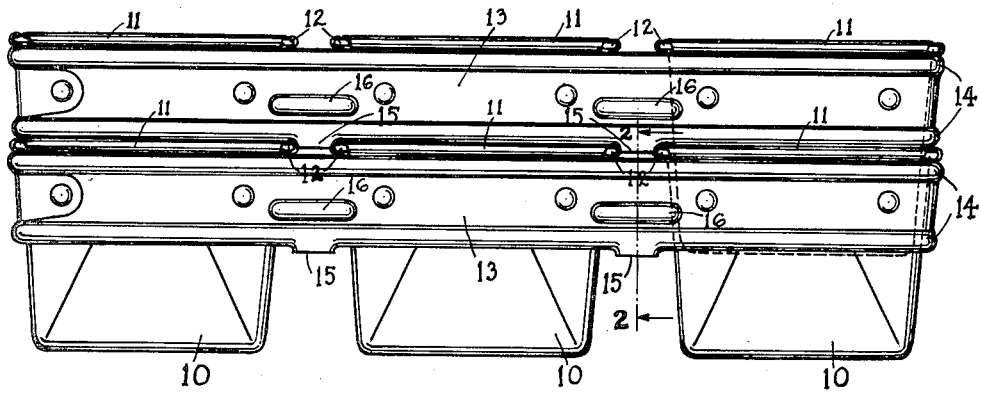
Fig. 1 is a side elevation of the several pan sets embodying the present invention in the stacked or nested relationship.

Baking pan sets consisting of a plurality of individual baking pans secured one to the other in various ways and by various means to create multiple unit pan sets are well known in the art. After use such pan sets are usually stacked in relatively tall piles or stacks by nesting one set within the other. It has been found that when, during this stacking and nesting, the exterior walls of the pans of one set contact with the interior faces of the walls of the pans of the set within which it is nested, it frequently mars or discolors the inner faces of the walls of the receiving set which discoloration is often transferred to the material baked within the pans. Furthermore, it has also been found that when a stack of nested pan sets becomes somewhat attenuated there is an inclination for the pans to move relatively in a horizontal direction and such movement frequently destroys the vertical alignment of the stack and causes it to lean or tilt one way or the other. Also, it is desirable when pan sets are stacked, which usually occurs when they are warm or hot, to provide sufficient space between the elements of the stack and between the units of the several sets to permit air circulation so that the sets cool uniformly and at the same time prevent the walls of the pans of the stacked sets from contacting at any point.

The present invention contemplates a pan set made up of individual pans combined into a multiple unit set by a strap or straps combined to form a frame encircling the pans of the set contacting with and secured to the exposed walls of the pans of the set. The strap or straps, of course, may be secured to the walls of the pans in any suitable manner and may be of any suitable construction. It is, however, contemplated to incorporate in the strap or frame a means whereby the pan sets when nested and stacked are prevented from having any lateral or relatively horizontal movement thereby creating a firm and rigid stack, the individual members of which are held against relative movement so that the stack is constantly vertical. The construction of this strap is such that when nested the walls of the units incorporated in the several stacked or nested pan sets are held in spaced relationship thus providing an air gap as well as preventing the discoloration of the interior faces of the walls of the pans of the sets.

In other words, the present invention proposes a nesting guide or guides carried by the straps of the individual pans which in itself does not contact with the tin plate of the individual pans of the set and holds the sets against relative movement, when in a stack, and at the same time maintains the walls of the pans of the sets within the stack in spaced relationship providing for an air circulation between the pans of the sets and preventing any discoloration or marring of the inner faces of the walls of the individual pans of the set.

Reference being had more particularly to the drawing, 10 designates a plurality of pans of any suitable form or construction which are combined to create a pan set. At the upper edges of the walls of each individual pan 10 are the flanges 11 which are bent outwardly and downwardly about a wire frame 12 to create an outstanding bead at the edges of the walls of the pan. It will be observed that at the corners of each individual pan 10, the wire frame 12 is exposed and not covered with the flanges 11. This is not essential as in some types of pan sets the wire frame 12, or its equivalent, is covered at all points including its corners by the flanges of the pan 10. However, as will be apparent, the exposed wire frames 12 when they are present in the pan set are the elements which receive the brunt of the contact in the present invention and where the frames 12, or their equivalent, are completely covered, it is at the corners of the individual pans and upon the outer surfaces of the corners that the present invention acts.

In that form of pan sets disclosed in the drawing, the individual pans 10 are held together by a strap 13 positioned along and against the exposed end walls of the pans 10. This strap 13 may be part of a frame extending completely around the pans 10 of the set, or it may be one of two or more straps, one upon each side of the set and each bearing against and secured to the exposed end walls of the pans combined in the set. The mounting, and to a large extent, the construction of the straps 13 and the cooperation thereof with the pans, have no particular bearing upon the present invention. In that form of strap 13 shown in the drawing, a bead 14 is formed along each longitudinal edge of each strap 13, the upper bead being positioned below the outstanding beads formed by the frames 12 at the upper edges of the walls of the pans 10, while the lower bead 14 is remote from the upper bead 14 and is positioned medially of the height of the end walls of the pans 10 of the set.

Positioned to correspond to and align with the spaces between the pans 10 of the set are one or more teats or lugs 15 formed from the lower edge of the strap 13, and in that form of the strap shown in the drawing, form the lower bead 14. This lug or lugs 15 project below the line of the lower edge of the strap 13 and are of a width substantially equal of the space between the beads at the edges of the walls of two adjoining or adjacent pans of the set. In that form of the invention shown in Fig. 1, a relatively short reinforcing bead 16 may be formed from the body of the strap above each lug 15 and approximately parallel to the lower bead 14, thereby reinforcing the strap 13 at the point or points where the lug or lugs 15 are formed therefrom. It is to be observed that the number of downwardly projecting lugs 15 provided along the lower edge of each strap 13 depends entirely upon the length of the pan set, so that while two are shown in Fig. 1 of the drawing, any number of lugs may be provided: either one for each space between adjoining pans 10 of the set, or one for each alternate space between adjoining pans of the set.

Figure 2:
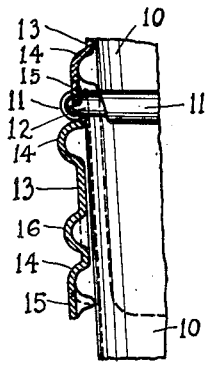
Fig. 2 is a vertical section taken along line 2—2 of Fig. 1 illustrating the cooperation between the straps and coacting elements upon stacking several pan sets.

When a plurality of pan sets, such as illustrated in Figs. 1 and 2 of the drawing, are nested for the purpose of creating a stack, the lugs 15 of each pan set enter the spaces between the adjoining pans of the set positioned below it and occupy substantially all of said spaces at the points corresponding to the corners of the pans 10 combining to make the set. If the wire frames 12 are exposed at the corners of the pans 10, which is the case in that form of the pan shown in the drawing, the lugs 15 operate against and approximately contact the exposed corner portions of the wire frames 12. As the lower edges of the straps 13 of the upper set rest upon the beads of the pans 10 of the set below, it is manifest that the lugs 15 extending below the lower edges of the straps 13, extend into and occupy the spaces between the pans 10 of the lower set and thereby prevent any longitudinal movement of the set of the stack relatively one to the other. This prevention of the longitudinal movement of the pan sets also prevents any contact between the walls of the pans 10 of the several sets thereby avoiding any discoloration of the tin plate or the marring or spotting of the inner surfaces of the walls of the pans 10. Furthermore, with such an arrangement there is ample air circulation between the pans of the sets and there is no inclination of the stack to tip or lean in any direction out of the vertical.

Figure 3:
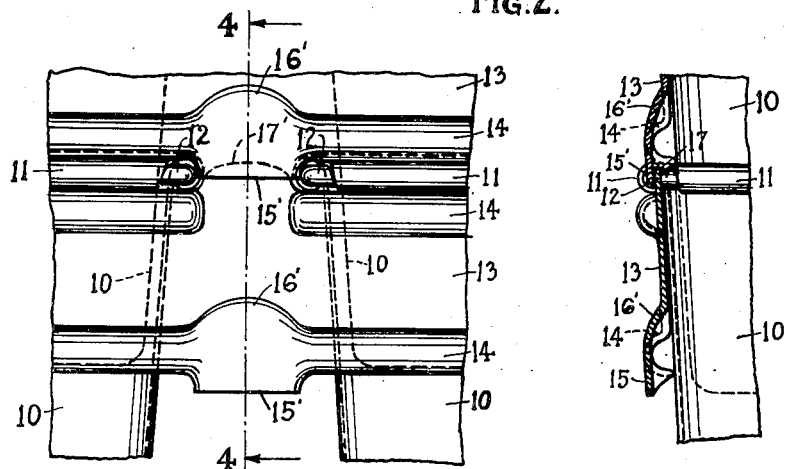
Fig. 3 is a fragmentary side elevation of portions of two pan sets nested illustrating a modified form of the present invention.
Figure 4:
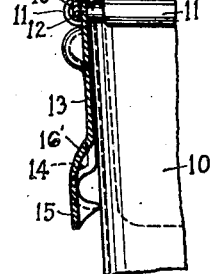
Fig. 4 is a vertical section taken along line 4—4 of Fig. 3.

The modification of the invention disclosed in Figs. 3 and 4 operates in substantially the same manner as that form of the invention shown in Figs. 1 and 2. The strap 13, at its lower edge in alignment with the space between pans, is provided with a downwardly extending lug 15' formed from the strap at the lower bead 14. In order to reinforce and strengthen the strap 13 at this point, the strap is enlarged or bulged outwardly above the bead, as at 16', in alignment with the lug 15' transversely of the strap 13. This lug 15', when the pan sets are stacked, operates exactly as does the lug 15 in the form of the invention shown in Figs. 1 and 2. Formed from the strap 13 and on the upper edge thereof, is a second lug 17 aligned transversely of the strap 13 with the lug 15'. It will be observed from Fig. 4 that the teat or lug 15' is formed outwardly from the strap 13 and may be said to form a continuation of the highest point of the bead 14. On the other hand, the lug or teat 17 is in alignment with and forms a substantial continuation of the body of the strap 13. Thus, when the pans are stacked, as illustrated in Figs. 3 and 4, the teat or lug 17 of the lower pan set is received at the rear of the lug 15' of the upper pan set. In this manner, the lugs or teats 17 provided upon the several pan sets of the stack act as guides cooperating with the teats or lugs 15' to insure the proper positioning of the several teats or lugs 15'.

It is manifest from the foregoing that the principal feature of the present invention is the provision of a member aligned with a space between two pans 10 of a set that will enter and be seated in a like space of a set in which the first set is nested at a point adjoining the corresponding corners of adjacent pans. Such an element or member obviously does not depend upon the construction of the pans or upon the manner and means by which the pans are secured into a set.

What is claimed is:—

1. The combination with a plurality of spaced baking pans, of a strap securing said pans into a set, a downwardly projecting lug formed from the lower edge of said strap in alignment with a space between the pans of the set, and a reinforcing bead formed from the strap adjoining the inner end of said lug.

2. The combination with a plurality of spaced baking pans, of a strap securing said pans into a set, lugs projecting in opposite directions from the edges of said strap in alignment with the spaces between pans.

3. The combination with a plurality of spaced baking pans, of a strap securing said pans into a set, and lugs projecting in opposite directions from the edges of said strap in alignment with the spaces between pans, said lugs being spaced and positioned in substantially parallel planes.

4. A baking pan set comprising a plurality of spaced pans, a strap securing said pans into a set, a lug extending below the lower edge of said strap in alignment with the space between pans, and a reinforcing bead formed from said strap parallel to the lower edge thereof and adjacent the inner end of said lug.

5. A baking pan set comprising a plurality of spaced pans, a strap securing said pans into a set and having an outstanding bead formed along its lower longitudinal edge, and a projecting lug formed from the said bead in alignment with a space between pans.

6. A baking pan set comprising a plurality of spaced pans, a strap securing said pans into a set and having an outstanding bead formed along its lower longitudinal edge, a projecting lug formed from the bead at the edge of the strap in alignment with a space between pans, and a reinforcing bead formed from the body of said strap between the edges thereof and adjoining the inner end of said lug.

7. A baking pan set comprising a plurality of spaced pans, a strap securing said pans into a set, and lugs extending in opposite directions from the opposed longitudinal edges of said strap in alignment with a space between pans.

8. A baking pan set comprising a plurality of spaced pans, a strap securing said pans into a set, a lug coplanar with the body of said strap extending from the upper edge thereof in alignment with a space between pans, and a second lug projecting downwardly from the lower edge of said strap in alignment transversely of the strap with the first lug and offset outwardly out of the plane of the strap.

9. A baking pan set comprising a plurality of spaced pans, a strap securing said pans into a set, having outstanding beads along its longitudinal edges, a lug formed from the upper of said beads and projecting in the plane of the body of the strap in alignment with a space between pans, and a lug formed from the lower of said beads and projecting downwardly in alignment transversely of the strap with the upper lug aforesaid.

10. A baking pan set comprising a plurality of spaced pans, a strap securing said pans into a set, having outstanding beads along its longitudinal edges, a lug formed from the upper of said beads and projecting in the plane of the body of the strap in alignment with a space between pans and a downwardly projecting lug formed from the lower of said beads in alignment transversely of the strap with the upper lug, said lower lug being offset outwardly to create a pocket for the reception of the upper lug of a subjacent set when nested therein.

11. A baking pan set comprising a plurality of spaced pans, a strap securing said pans into a set, having outstanding beads along its longitudinal edges, a lug formed from the upper of said beads and projecting in the plane of the body of the strap in alignment with a space between pans, and a downwardly projecting lug formed from the lower of said beads in alignment transversely of the strap with the upper lug, said lower lug and a portion of the strap adjoining its base being offset outwardly to create a pocket for the reception of the upper lug of a subjacent set when nested therein.

JOSEPH G. JACKSON.